United States Patent [19]

Melchior

[11] 3,840,741

[45] Oct. 8, 1974

[54] SEMICONDUCTOR DELAY LINE DETECTOR FOR EQUALIZATION OF OPTICAL FIBER DISPERSION

[75] Inventor: Hans Melchior, Basking Ridge, N.J.

[73] Assignee: Bell Telephone Laboratories, Incorporated, Murray Hill, N.J.

[22] Filed: Sept. 18, 1973

[21] Appl. No.: 398,419

[52] U.S. Cl. ............... 250/211 J, 250/226, 250/227

[51] Int. Cl. ........................... G01j 3/34, G02b 5/14

[58] Field of Search ................. 250/211 J, 226, 227

[56] References Cited

UNITED STATES PATENTS

| | | | |
|---|---|---|---|
| 3,773,289 | 11/1973 | Gloge | 250/211 J |
| 3,777,149 | 12/1973 | Marcatili | 250/227 X |
| 3,777,150 | 12/1973 | Miller | 250/227 X |
| 3,781,550 | 12/1973 | Zeidler | 250/211 J |

*Primary Examiner*—Archie R. Borchelt
*Assistant Examiner*—T. N. Grigsby
*Attorney, Agent, or Firm*—D. I. Caplan

[57] ABSTRACT

The propagation in an optical fiber of an incoherent optical signal pulse containing a moderate spread of optical wavelength carrier components, such as supplied to the optical fiber by a light emitting diode (LED) source, results in a broadening (distortion) of the optical output signal emerging from the fiber. This distortion is caused by the fact that different optical wavelengths propagate at different velocities through the fiber material, that is, by the dependence of refractive index upon wavelength (material dispersion); and also by the fact that different optical modes propagate at different velocities (mode dispersion). In order to compensate for such distortions, a semiconductor charge carrier drift delay line is located in the path of the optical radiation emanating from the fiber. Advantageously, this semiconductor delay line is depleted of bulk majority charge carriers by means of a reverse voltage bias and is terminated by a charge carrier detector having an inherent gain (such as an avalanche diode or a transistor). The delay line is arranged such that the time delays of different wavelengths or modes in the fiber are compensated by the different drift time delays of the charge carriers generated by the different wavelengths or modes absorbed at different locations in the semiconductor delay line. In the case of mode dispersion compensation, the semiconductor delay line is located in the far optical radiation field region of the output end of the optical fiber; whereas, in the case of fiber material dispersion compensation, the delay line is located behind an optical prism (or diffraction grating) deflector situated between the delay line and the output end of the fiber

11 Claims, 3 Drawing Figures

SEMICONDUCTOR DELAY LINE DETECTOR FOR EQUALIZATION OF OPTICAL FIBER DISPERSION

FIELD OF THE INVENTION

This invention relates to optical communications systems, and more particularly to photodetector delay equalizers for use in such systems.

BACKGROUND OF THE INVENTION

In the transmission of optical signals through optical fibers in optical communication systems, the optically transparent material of the fiber is characterized by a dependence of the refractive index upon optical wavelength (material dispersion). Hence, different optical wavelengths undergo different time delays while propagating through the fiber from its input end to its output end. When using broadband optical source for producing the optical carrier wave in the fiber, such as supplied by a light emitting semiconductor diode (LED), a relatively narrow input signal pulse of time duration $t_1$ at the input end of the fiber exits from the output end of the fiber as a relatively broad output signal pulse of duration $t_2$ greater than $t_1$ by an undesirably large amount. This broadening of output pulse is equal to the difference of time delays in the fiber of the different optical wavelength components supplied by the optical source. Thereby, the optical fiber material dispersion sets an undesirably low limit on the maximum signal bit transmission rate obtainable in a given optical transmission system, particularly of the kind including a given optical source supplying an optical carrier wave having a moderate spread, of the order of 500 angstroms, of differing wavelength components for transmission through a given optical fiber. In many instances, this problem of fiber material dispersion imposes a more severe limitation upon the maximum information bit rate obtainable with an optical fiber of given length than that imposed by the problem of multimodes, such multimodes (at a given wavelength) propagating at different velocities in the fiber (mode dispersion). Therefore, it would be desirable to have a means for reducing the distortion broadening (in time) of optical signal pulses propagating through an optical fiber caused by the fiber's material dispersion. In addition, it would be desirable to have a photodetector which can compensate either for fiber material dispersion or for mode dispersion, in order to be able to utilize longer pieces of optical fiber in a communication system capable of transmitting optical signals at a given bit (data) rate and given optical carrier wave intensity.

SUMMARY OF THE INVENTION

In order to compensate for optical fiber material dispersion, an optical diffraction grating (or a prism) is located at the exit port of the optical fiber so that the optical wave exiting from the fiber is incident on the grating. The grating thereby deflects the different wavelength components through different angles of deflection and directs these components onto a semiconductor body portion containing a semiconductor delay line which is depleted of bulk majority charge carriers. This delay line is terminated in an integrated semiconductor charge carrier detector having gain, such as an avalanche diode or a transistor. The semiconductor delay line is geometrically situated so that the different wavelength components are absorbed and generate drifting charge carriers by the phenomenon of photo excitation in this delay line at different distances from the charge detector. Charge carriers of a given type then drift to the charge detector such that the different time delays previously undergone in the fiber by these different wavelength components are compensated by the different time delays of the correspondingly different charge carriers of the given type which drift in the delay line to the charge detector. This compensation (equalization) is achieved by geometrically arranging the delay line (charge carrier drift region) of the semiconductor such that those wavelength components which are most delayed in the optical fiber are incident and absorbed at locations in the semiconductor delay line closest to the charge detector, and those wavelength components which are least delayed in the fiber are absorbed at locations in the delay line portion farthest from the charge detector. Thereby, those charge carriers of the given type drifting to the charge detector after having been generated by the absorption of the optically more delayed wavelength components from the fiber are less delayed on drifting through the delay line to the charge detector.

In a specific embodiment of this invention, the output wave exiting from an optical fiber is incident upon an optical diffraction grating which angularly separates the optical wavelength components in the output. These wavelength components are incident upon a major surface portion of a substantially uniform high resistivity ("semi-intrinsic" or "intrinsic") slightly $p$-type ($\pi$) semiconductor body portion at various locations between a pair of localized strongly $n$-type ($n^+$) zones depending upon wavelength. Advantageously, for detecting optical radiation of wavelength in the range of about 3,000 to 12,000 angstroms, the $\pi$-type body portion is an epitaxially grown layer on a strongly $p$-type ($p^+$) single crystal substrate of semiconductive silicon. Alternatively, a $\pi$-type semiconductor body, into which a $p^+$ layer has been diffused or implanted, can be utilized. In operation, charge carriers are produced at the various locations in the delay line where the various wavelength components are incident and absorbed. Both $n^+$ zones are subjected to voltages of positive polarity with respect to the substrate, in order to deplete the $\pi$-type layer at least in the drift region between these $n^+$ zones. One of these $n^+$ zones is more positively biased than the other, in order to produce a steady drift electric field between these zones in the $\pi$ layer (delay line drift region). The drift electric field, produced by the difference of steady voltages applied to the respective $n^+$ zones, causes negatively charged carriers (i.e., electrons) to drift in the $\pi$-type layer towards the more positively biased $n^+$ zone serving as a charge detecting zone of an avalanche charge detector. When the various drifting electrons reach this detecting $n^+$ zone, an avalanche is produced which results in a current in the external circuit, for example, in a load connected to the $p^+$ substrate. Advantageously, in order to provide a "guard ring" for concentrating the high field region (where avalanche carrier multiplication occurs) to the region where the drifting electrons reach this detecting $n^+$ zone, a lightly doped n-type zone is added on the "outside" edge of the $n^+$ detecting zone (i.e., the edge situated away from the region of drifting electrons). By suitably choosing the dispersive power of the optical prism, and the magnitude of the drift field between the $n^+$ layers, as well as suitably locating and orienting the delay line, the various time delays of the drifting charge carriers can be made at least approximately to equalize (compensate for) the various optical time delays of the corresponding wavelength components previously undergone in propagating through the fiber.

In an approximation, the time delays in the fiber vary approximately linearly with wavelength; the deflection caused by the diffraction grating varies approximately linearly with wavelength and hence the positions at which the wavelength components are absorbed in the semiconductor body vary approximately linearly with distance from the charge-detecting $n^+$ zone, so that the drift time delays also vary approximately linearly with wavelength but in a compensating sense with respect to the delays in the fiber.

For fiber mode delay dispersion compensation, rather than for fiber material dispersion, the optical deflector (prism or grating) is omitted and the semiconductor delay line (in a circularly symmetric configuration) is positioned in the far optical radiation field region of the exit port of the fiber, with some modifications in the geometry of the detector as described in greater detail below.

While the invention described herein is directed at solving similar problems to those treated in the patent application of D.C. Gloge-Case Ser. No. 398,420 filed simultaneously herewith, this invention was conceived independently therefrom.

BRIEF DESCRIPTION OF THE DRAWING

This invention, together with its objects, features and advantages, can be better understood from the following detailed description when read in conjunction with the drawing in which.

DETAILED DESCRIPTION

Figure 1:
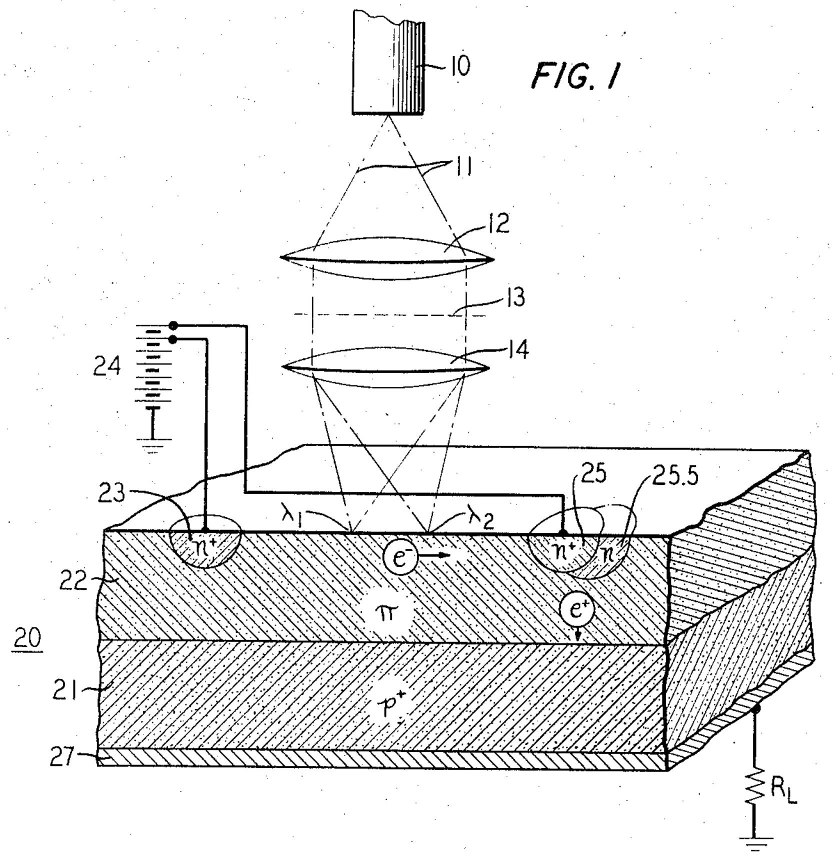
FIG. 1 is a diagram, partly in cross section, of apparatus for equalization of optical fiber material dispersion, including an avalanche charge detector, in accordance with a specific embodiment of the invention.

As shown in FIG. 1, the output end of an optical fiber 10 supplies an output optical wave 11 incident upon a converging spherical lens 12 (alternatively cylindrical) located on the input side of an optical grating 13. The output optical wave 11 contains modulated optical carrier wave components supplied to the input end of the fiber (not shown) by an optical carrier wave source, such as a modulated gallium arsenide light-emitting diode source. The wavelength spread of the optical carrier wave supplied by such a source is typically about 400 angstroms. After passing through another converging spherical lens 14 (alternatively cylindrical), located on the output side of the grating 13, the various wavelength components of the carrier wave are incident upon a semiconductor delay line photodetector 20. In particular, these wavelength components are focused by the lens 14 onto a major surface of a $\pi$-type semiconductor layer 22 which has, for example, been epitaxially grown on a previously exposed major surface of a strongly $p$-type conductivity ($^+$) semiconductor single crystal substrate 21. The longest and shortest wavelength components, $\lambda_2$ and $\lambda_1$, respectively, of the wave 11 are focused on this major surface advantageously between a pair of $n^+$ (strongly $n$) conductivity type localized surface zones 23 and 25. These localized $n^+$ surface zones are for the purpose of furnishing locations for external ohmic contact to a battery 24 which is suitably electrically connected for producing a drift field between these $n^+$ zones in the epitaxial layer 22. Advantageously, both $n^+$ zones 23 and 25 are reverse biased by a voltage potential difference with respect to the $p^+$ substrate 21, so that at least the entire operating region in the epitaxial layer 22 is depleted of bulk majority charge carriers; whereas a somewhat smaller voltage difference is applied across zones 23 and 25, in order to produce a drift field which urges negative electrons toward zone 25. This zone 25 serves as the charge-detecting $n^+$ zone. In order to prevent avalanche carrier multiplication at the "outside" edge of the detecting $n^+$ zone 25 (i.e., the edge located away from the localized $n^+$ zone 23), which might otherwise produce undesirable spurious premature breakdown, advantageously an $n$-type zone 25.5 is included at this outside edge of the $n^+$ zone 25. This n-type zone is advantageously of higher electrical conductivity than that of the $\pi$ zone 22 but of lower electrical conductivity than that of the $n^+$ zone 25 itself, as achieved by suitable doping with significant impurities as known in the art. Advantageously, moreover, the reverse voltage bias provided by the battery 24 to the $n^+$ zone 25 is such that any avalanche formed in the neighborhood of zone 25 is nonself-sustaining, as known in the art. Whenever electron hole-pairs are produced in response to incident light upon the epitaxial layer 22, the electrons of these pairs are thus urged toward the $n^+$ zone 25 by reason of the drift field, as indicated by the horizontal arrow in the drift region of the epitaxial $\pi$ layer 22. If and when electrons reach zone 25, an avalanche of charge carriers is produced thereat. The majority of the electronic holes created in the avalanche are urged (as indicated by the vertical arrow beneath zone 25) toward an ohmic metal plate 27 on the opposite surface of the substrate 21. By reason of such an avalanche, an external electrical current is produced and detected in the load $R_L$ of the external circuit connected to the metal plate 27. Thus, the voltage applied across zone 25 with respect to the $p^+$ substrate 21 should be below the avalanche voltage in the range suitable for nonself-sustained avalanche.

In an illustrative example of parameter suitable for the detector 20, the semiconductor substrate 21 is single crystal $p^{}$ silicon having a substantially uniform bulk resistivity below about 0.1 ohm centimeters. The thickness of this substrate 21 is about 1000 microns. The epitaxial layer 22 has a thickness of about 30 microns and a substantially uniform resistivity of over about 30 ohm centimeters. The $n^+$ zones 23 and 25 both have a depth beneath the top exposed surface of the epitaxial layer 22 of approximately 0.5 microns. These $n^+$ zones have resistivities of about 0.1 ohm centimeters, and are spaced apart by a distance of about 250 microns. The n-type guard zone 25.5 can be about 3 to 5 microns in depth, with a resistivity of about one ohm centimeter. The battery 24** is arranged to produce a voltage bias of approximately 90 volts to the $n^+$ zone 23, and of approximately 100 volts to the detecting $n^+$ zone 25, thereby providing a 10-volt potential difference across $n^+$ zones 23 and 25 to produce a drift electric field therebetween of about 400 volt/centimeter.

Advantageously, the shape of the cross sections of the $n^+$ zones 23 and 25 should be made sufficiently wide in the direction perpendicular to the plane of the drawing (FIG. 1) such that the vast majority of the electrons created in the epitaxial layer 22, in response to the optical excitation of the incident light wave, should drift along substantially mutually parallel lines to the $n^+$ zone 25. Thereby, a rather sharp arrival time distribution of drifting electrons on arriving at avalanche zone 25 is obtained in response to a sharp pulse of optical energy of a given wavelength in the wave 11.

The theory of the equalization of fiber material dispersion provided by the detector 20 is as follows. The diffraction grating 13 is arranged to deflect the respective longest and shortest wavelengths, $\pi_2$ and $\pi_1$, in the optical wave 11 (in a particular "order" of the grating deflection) at locations on the surface of the epitaxial layer 22 between the $n^+$ zones 23 and 25. Those shorter wavelength components which ordinarily have been the more time delayed by the fiber material (i.e., smaller group velocity — larger group refractive index) are less deflected by the grating, in accordance with the customary grating formula $m\lambda = d \sin \theta$, where $m$ is the "order" of the grating deflection, $d$ is the grating spatial periodicity, and $\theta$ is the angle of deflection with respect to the normal to the grating. In order to avoid confusion from different orders of the same grating, it is desirable that the grating be selected or tailored so that only one "order" of the grating deflections is incident upon the epitaxial layer 22. In any event, in FIG. 1 the left-right orientation of zone 23 relative to zone 25 should be selected such that the electrons produced by absorption in the epitaxial layer 21 corresponding to the most delayed wavelength components in the fiber 10 material should have the least distance of drift to the $n^+$ zone 25. Thereby, those wavelength components which were most delayed in the fiber 10 are least delayed in the delay line formed by the drift region in the $\pi$ layer 22 between the $n^+$ zones 23 and 25; thus, the electron charge carrier drift times tend to compensate for the corresponding optical fiber material delay times. In mathematical terms, the time delay $t_f$ in the fiber 10 can be expressed as:

$$t_f = Ln''/c \tag{1}$$

where:

$L$ is the length of the fiber;

$n'' = n' - \lambda(dn'/d\lambda)$ is the group refractive index of the fiber;

$n'$ is the index of refraction of the fiber; and $c$ is the speed of light in vacuum. The distance $x$ from the detecting $n^+$ zone 25 (in a direction parallel to the drift electric field established by the battery 24 across zones 23 and 25) at which a given wavelength component is directed upon and absorbed by the epitaxial $\pi$ layer 22 is given by:

$$x = -m\lambda l/d + \text{constant} \tag{2}$$

where $l$ is the distance from the grating to the semiconductor layer 22 (where the light is focused by the lens 14). Thus, the difference in drift delay times, $t_1 - t_2 = \Delta t_D$, in the corresponding charge carriers drifting to the $n^+$ zone 25 after having been generated by wavelength components $\lambda_1$ and $\lambda_2$, for example, is given by:

$$\Delta t_D = \Delta x/v_D = -m(\Delta\lambda)l/dv_D \tag{3}$$

where $v_D$ is the drift velocity of electrons in the drift region delay line of the $\pi$ layer 22, and $\Delta\lambda$ is equal to $\lambda_2 - \lambda_1$. On the other hand, from equation (1) above, the difference in optical delay times $\Delta t_F$ of these same wavelength components in the fiber 10 is given by:

$$\Delta t_F = L(\Delta n'')/c \tag{4}$$

where $\Delta n$ is the difference in refractive indices of the wavelength components corresponding to $\lambda_1$ and $\lambda_2$ in the fiber 10. For compensating equalization of delay times, $\Delta t_D$ and $\Delta t_F$ should add to zero; so that, combining equations (3) and (4), it is found that equalization is achieved if:

$$ml/dv_D = L/c\ \Delta n''/\Delta\lambda \tag{5}$$

Thus, since $\Delta n''/\Delta\lambda$ is independent of wavelength in a linear approximation, the condition expressed by equation (5) can easily be satisfied for all carrier wavelength components in the range between $\lambda_1$ and $\lambda_2$ propagating in the fiber, with an appropriate selection of the length $L$ of the fiber 10 in combination with the other relevant parameters. In this connection, it should be noted that, for equalization of a $\Delta t_F$ equal to about 40 nanosecond, the drift electric field in the layer 22 between $n^+$ zones 23 and 25 produced by the battery 24 is typically about 400 volt/cm, to yield an electron drift velocity typically of about $6\times10^5$ cm/sec. As noted above, a voltage difference of about 10 volts between the $n^+$ zones 23 and 25 is maintained during operation, to provide this drift field. Since the drift region is depleted of bulk majority carriers and since all the $n^+p$ junctions (formed by the interfaces of $n^+$ type zones 23 and 25, as well as by $n$ zone 25.5, with the $\pi$ layer 22) are subject to a reverse voltage bias, only a relatively small leakage current (of order of a microampere or less) flows through the photodetector 20. Thus, one advantageous feature of the photodetector 20 is the fact that relatively small (of order of $10^{-5}$ watt or less) standby DC power will be required to maintain the drift field.

Figure 2:
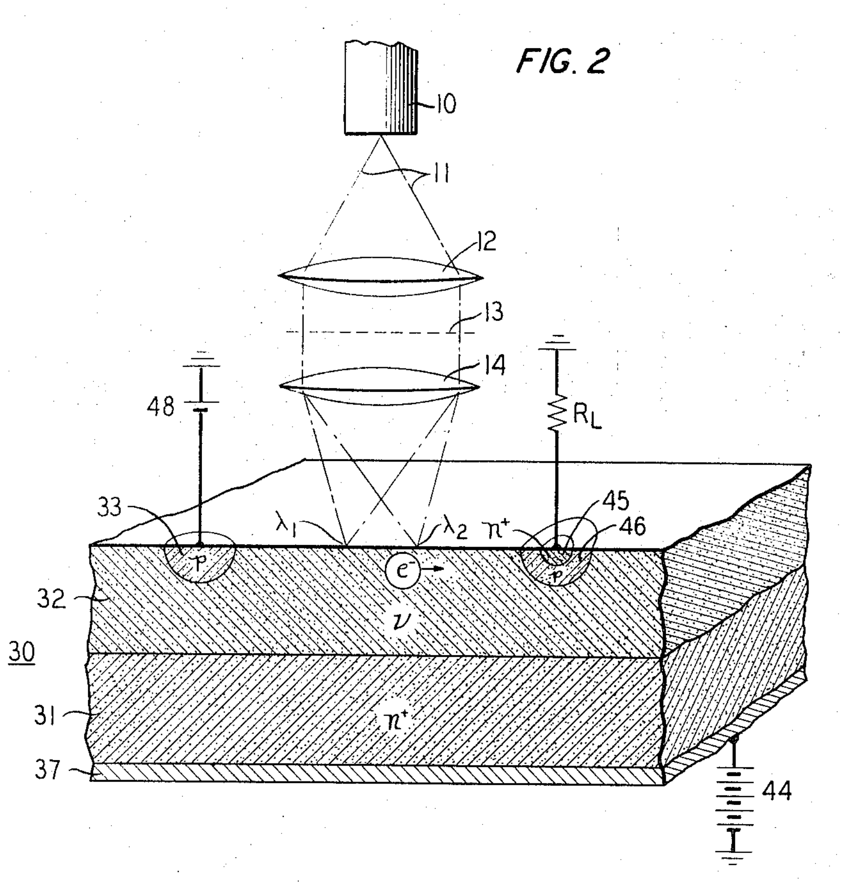
FIG. 2 is a diagram, partly in cross section, of apparatus for equalization of optical fiber material dispersion, including a transistor charge detector, in accordance with another specific embodiment of the invention.

FIG. 2 shows an alternative specific embodiment of fiber material dispersion equalization apparatus according to the invention utilizing a delay line photodetector 30 terminated in a transistor detector rather than an avalanche diode detector as previously discussed in connection with FIG. 1. Many of the elements are the same or similar to those previously discussed in connection with FIG. 1. In particular, the optical fiber 10 together with the exiting wave 11, the input lens 12, the grating 13 and the lens 14 are substantially the same as in FIG. 1. The delay line detector 30 (FIG. 2) has similar elements to those in the detector 20 (FIG. 1) and accordingly these elements had been designated by reference numerals which are equal to those used in FIG. 1 plus 10. The delay line detector 30 includes an $n^+$ substrate 31 upon which has been epitaxially grown a relatively high resistivity intrinsic or semi-intrinsic epitaxial layer 32 denoted by $\nu-$ (slightly $n$ type) conductivity. The epitaxial $\nu$— layer 32 contains a pair of $p$ surface zones 33 and 46 as well as an $n^+$ zone surface zone 45 contained within the $p$ zone 46. The $n^+$ zone 45 serves as an emitter of the transistor whose base is provided by the $p$ zone 46 which is typically (but not necessarily) electrically floating. A battery 48 provides a voltage of negative polarity to the $p$ zone 33 with respect to the $p$ zone 46, thereby producing a drift electric field tending to urge electrons in the $\nu$ layer 32 toward the $p$ zone 46. These electrons are generated in response to the various wavelength components of the wave energy incident upon the epitaxial layer 32 between these $p$ zones 33 and 46. Upon arriving at the $p$ zone 46, these electrons produce a current characterized by conventional transistor gain in the load $R_L$ connected to the emitter $n^+$ zone 45. It should be understood that the collector region of the transistor (whose emitter is formed by the $n^+$ zone 45) is provided by the $n^+$ substrate 31 to which a metal plate ohmic contact 37 is attached, together with appropriate collector bias voltage supplied by the battery 44 thereto.

In a typical example, by way of illustration only, the $\nu$ zone 32 is an epitaxial silicon semiconductor having a substantially uniform resistivity of about 20 ohm centimeters or more. The battery 48 provides a bias voltage of negative polarity to zone 33 of about 10 volts; whereas the battery 44 provides a bias voltage of positive polarity to $n^+$ substrate 31 of about 50 volts.

In operation, the device illustrated in FIG. 2 operates very similarly to that shown in FIG. 1, except that instead of an avalanche at the detector, a current is produced in the external load $R_L$ in accordance with conventional transistor gain mechanisms.

To form the various zones 23, 25 (FIG. 1) and 33, 46, 45 (FIG. 2), conventional masking in combination with appropriate impurity diffusion or ion implantation can be used as known in the art. Alloy diffusion can alternatively be utilized for forming zones 23, 25 and 33, 45.

Figure 3:
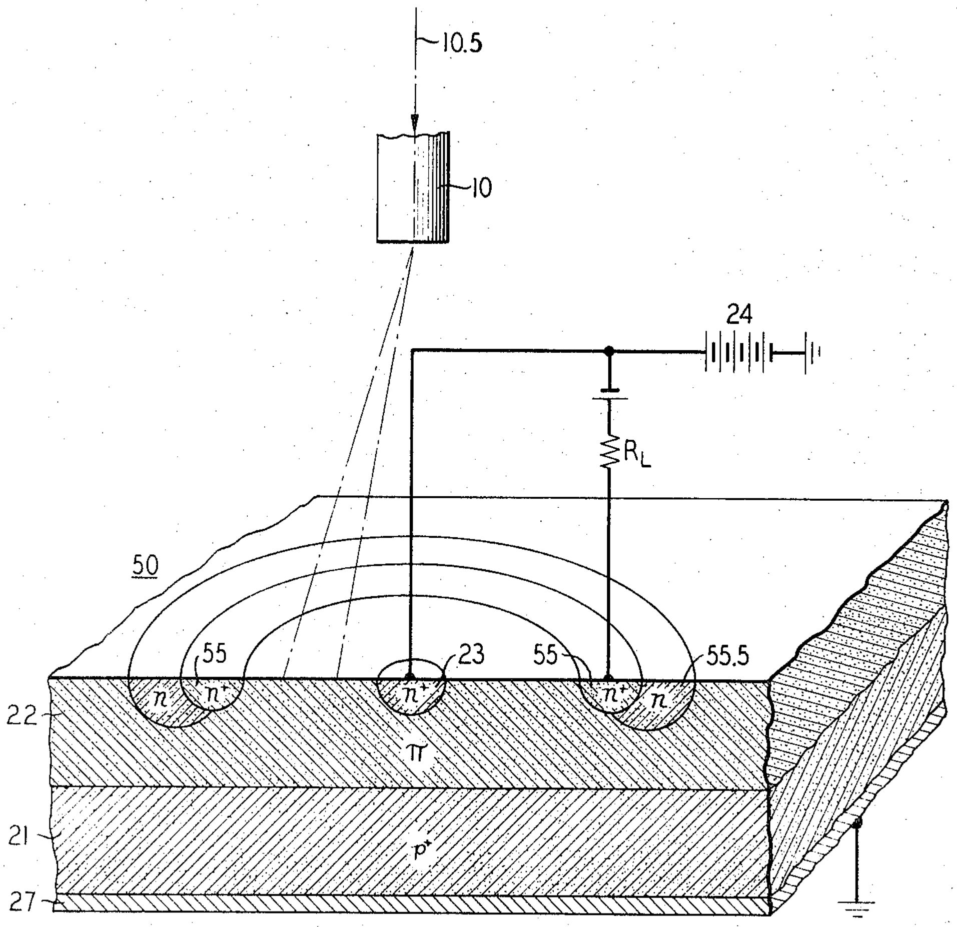
FIG. 3 is a diagram, partly in cross section, of apparatus for equalization of optical fiber mode dispersion in accordance with yet another specific embodiment of the invention.

Whereas the photodectors 20 and 30 in FIGS. 1 and 2, respectively, are useful in equalization apparatus for compensating optical fiber material dispersion, the photodetector 50 in FIG. 3 is useful in apparatus for compensating optical fiber dispersion due to the presence of multimodes (mode dispersion) at a given wavelength in the fiber. Many of the elements in FIG. 3 are the same as discussed above in connection with FIG. 1 and accordingly these elements have been labeled with the same reference numerals. In FIG. 3, the optical output radiation 51 from the fiber 10 is characterized in that different modes exit from the output port of the fiber 10 at different angles with respect to the central axis 10.5 of the fiber. Those modes which are most delayed in the fiber exit from the fiber at greater angles with respect to the axis 10.5. Advantageously, the axis 10.5 of the fiber 10 is oriented normal to the exposed major surface of the $\pi$-type semiconductor layer 22 which is situated in the far optical radiation field relative to the exit port of the fiber 10, such that the extension of the axis 10.5 intersects the center of the $n^+$ zone 23 in the layer 22. An annular ringshaped localized charge-detecting surface zone 55, of $n^+$ conductivity type, symmetrically surrounds the $n^+$ zone 23. Advantageously, the outside edge of this zone 55 is protected by an $n$-type "guard ring" zone 55.5, in similar manner and for the same reason as the guard zone 25.5 protecting zone 25 in the photodetector 20. Since the modes exiting from the fiber 10 are circularly symmetric, it is for this reason that the $n^+$ zone 55 is circularly shaped, otherwise zone 55 functions in much the same way as charge-detecting zone 25 in FIG. 1. The $\pi$-type layer 22 is depleted of charge carriers (except for drifting carriers in response to optical radiation excitation) due to the reverse bias voltage supplied by the battery 24 to zones 23 and 55 relative to the $p^+$ substrate 21.

In operation of the photodetector 50, the optical radiation . . . . strikes the exposed major surface of the photodetector 50 at different distances from the central $n^+$ zone 23 in accordance with the different angular propagation features of different modes. In accordance with known principles, electron hole-pairs are produced in the layer 22 in response to the absorption therein of this optical radiation. In particular, the electrons of these pairs drift to the $n^+$ angular zone 55 at which an avalanche is produced in response to the arrival of these electrons, similar to the operation of the photodetector 20 shown in FIG. 1. As a consequence of this avalanche, a sharp increase in current is detected in the load $R_L$. Since those modes which are most delayed in the fiber strike the layer 22 closest to the annular detecting zone 55, the electrons generated thereby drift the shortest distance prior to causing the sharp increase in current through the load $R_L$. Thus, compensation for the mode delay in the propagation of the various modes through the fiber 10 is achieved by the photodetector 50.

It should be understood that although this invention has been described in terms of specific embodiments, various modifications can be made without departing from the scope of this invention. For example, in the delay line detector 30, $n$-type conductivity may be replaced by $p$-type conducivity zones, and vice versa, in conjunction with semiconductors such as silicon or germanium, or other appropriate semiconductors in which a drift field can be established in a depleted region of the semiconductor and in which a transistor may be conveniently incorporated in accordance with the drawing in FIG. 2. However, it should be noted that when using a semiconductor such as silicon for the detector 20 (FIG. 1), it may not be feasible to interchange $n$- and $p$-type conductivity due to the fact that avalanching with electronic holes, as opposed to electrons, is not practicable at the present state of the art, due to the problem of excessive noise in the case of avalanche initiated by holes in silicon. However, other semiconductor materials may become available in which avalanches with holes are practicable, and in those cases these $n$- and $p$-type semiconductor zones may be interchanged.

It should be mentioned that instead of forming by epitaxial growth the relatively thin but high resistivity layers 22, 32 and 22 of the photodetectors 20, 30 and 50, respectively, which may be difficult where high resistivity layers of thicknesses of over about 50 microns are desired, as an alternative such layers may be formed by first forming such correspondingly thin high resistivity layers from high resistivity semiconductor bulk material (as by conventional mechanical polishing and chemical etching procedures) followed by diffusion or implantation of the low resistivity $p^+$ regions 21 (FIGS. 1 and 3) or $n^+$ region 31 (FIG. 2).

It should also be understood that the diffraction grating 13 may be replaced by an optical prism, remembering that the diffraction grating 13 invariably produces a wavelength dispersion corresponding to anomalous dispersion of a prism; so that if the optical prism material is characterized by normal dispersion, then the zones 23 and 25 in FIG. 1, or zones 33 and 46 in FIG. 2, must be interchanged. Moreover, instead of lenses 12 and 14 in FIGS. 1 and 2, pieces of graded index of refraction fibers can be used for optical focusing purposes. Finally, it should be obvious that the photodetector 30 (FIG. 2) can be modified to serve the function of equalization of fiber mode dispersion (rather than fiber material dispersion) in much the same manner that the photodetector 20 (FIG. 1) was modified to form the photodetector 50 (FIG. 3), i.e., by removing the grating 13 and by making the zones 45 and 46 in the form of annularly shaped rings around the zone 33.

What is claimed is:

1. A photodetection apparatus for equalization of optical fiber dispersion which comprises a depleted semiconductor body portion of a semiconductor body located such that said optical radiation after emerging from the fiber is incident upon said portion, said depleted portion terminated in said body by detection means characterized by charge carrier gain, said portion being located with respect to the fiber such that the components which are more delayed in the fiber are incident on the depleted semiconductor body portion at positions less remote from the detection means than other components which are less delayed in the fiber.

2. Apparatus recited in claim 1 in which the detection means include an avalanche diode.

3. Apparatus recited in claim 2 in which the said diode comprises a relatively low resistivity first semiconductive localized surface zone located in a relatively high resistivity semiconductor layer, said high resistivity layer being located on a semiconductive substrate of opposite conductivity type from that of said low resistivity first zone, and said depleted semiconductor portion being provided by said high resistivity layer.

4. Apparatus according to claim 3 which further includes circuit means for applying a voltage bias to the low resistivity zone relative to the substrate which is sufficient for producing a nonself-sustaining avalanche in response to charge carriers in the high resistivity layer drifting to said first zone.

5. Apparatus according to claim 3 which further comprises a second relatively low resistivity semiconductor zone of the same conductivity type as said first zone and circuit means for applying a voltage bias across said first and second zones sufficient to produce a drift electric field between said first and second zones which is directed so that a first type of charge carrier drift times of photo-excited charge carriers, which are generated in the said high resistivity layer and which drift to the detection means, tend to compensate for the optical delay times in the fiber corresponding to the different wavelength components.

6. Apparatus according to claim 1 in which the detection means include a transistor.

7. Apparatus according to claim 6 in which the said transistor comprises a relatively low resistivity first semiconductive surface zone in a relatively high resistivity semiconductor layer, said layer located on a semiconductive substrate of opposite conductivity type from that of said low resistivity first zone, said first zone serving as a base zone of the transistor during operation and said depleted semiconductor portion being provided by said high resistivity layer.

8. Apparatus according to claim 3 which further includes circuit means for applying a voltage to a second surface zone in said layer spaced apart from said first zone and of the same conductivity type as said first zone.

9. Apparatus according to claim 8 which further comprises circuit means for applying a voltage bias across said first and second zones sufficient to produce a drift electric field between said first and second zones which is directed so that the charge carrier drift times of photo-excited charge carriers, which are generated in the said high resistivity layer and which drift to the detection means, tend to compensate for the optical delay times in the fiber corresponding to the different wavelength components.

10. Apparatus for equalization of fiber mode dispersion according to claim 1 in which said depleted body portion is located in the far optical radiation field region of the exit port of the fiber, for fiber mode dispersion compensation.

11. Apparatus for equalization of fiber material dispersion according to claim 1 which further includes an optical deflection means, located at the exit port of the fiber between said port and the depleted body portion, for angularly separating different wavelength components in the optical radiation exiting at said port in accordance with the wavelength.

* * * * *